F. A. HOWARTH.
VEHICLE WHEEL TIRE.
APPLICATION FILED FEB. 9, 1915.
1,185,403.
Patented May 30, 1916.
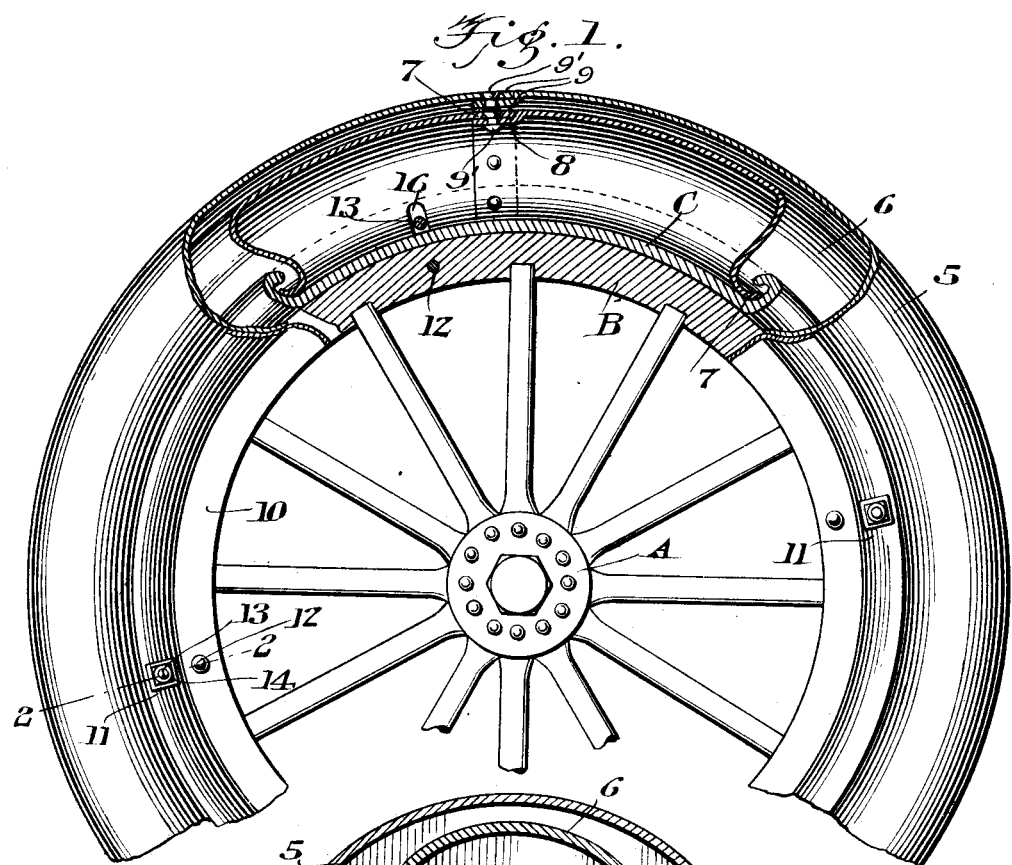
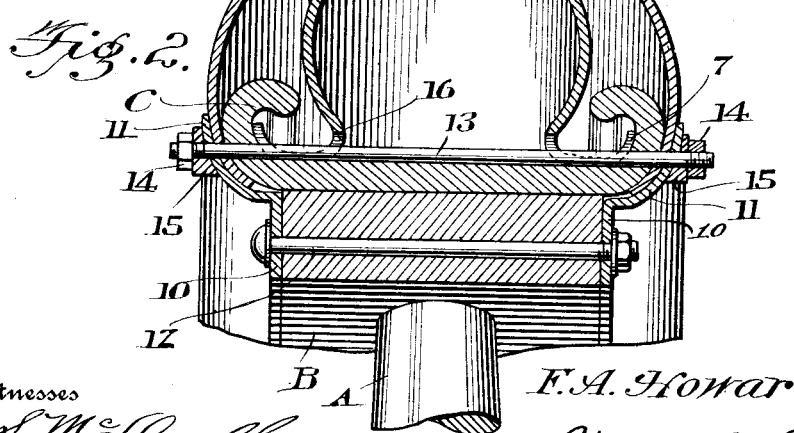
Witnesses
Inventor
F. A. Howarth
By Victor J. Evans
Attorney

UNITED STATES PATENT OFFICE.

FREDERICK A. HOWARTH, OF PHILADELPHIA, PENNSYLVANIA.

VEHICLE-WHEEL TIRE.

1,185,403.    Specification of Letters Patent.    Patented May 30, 1916.

Application filed February 9, 1915. Serial No. 7,065.

*To all whom it may concern:*

Be it known that I, FREDERICK A. HOWARTH, a citizen of the United States, residing at Philadelphia, in the county of Philadelphia and State of Pennsylvania, have invented new and useful Improvements in Vehicle-Wheel Tires, of which the following is a specification.

The invention relates to vehicle wheel tires, and more particularly to the class of metallic tires for vehicle wheels.

The primary object of the invention is the provision of a tire of this character wherein inner and outer tubes, preferably made from spring metal, are mounted upon the felly or rim of the wheel so that the tire will possess maximum resiliency, yet it will be rendered practically puncture proof.

Another object of the invention is the provision of a tire of this character wherein the same is made from sections of spring metal and are assembled for the fitting thereof upon the felly of a vehicle wheel, and when in use will have maximum resiliency, and at the same time will avoid blowouts, punctures, or the like.

A further object of the invention is the provision of a tire of this character which is simple in construction, readily and easily mounted on or removed from the vehicle wheel, strong, durable, possessive of maximum resiliency, and also which is inexpensive in manufacture.

With these and other objects in view, the invention consists in the construction, combination and arrangement of parts as will be hereinafter fully described, illustrated in the accompanying drawing, and pointed out in the claims hereunto appended.

In the drawing:—Figure 1 is a fragmentary side elevation of a vehicle wheel showing the tire constructed in accordance with the invention, a portion of the felly and the tire being broken away. Fig. 2 is an enlarged sectional view on the line 2—2 of Fig. 1.

Similar reference characters indicate corresponding parts throughout the several views in the drawing.

Referring to the drawing in detail, A designates a portion of a vehicle wheel having the felly B on which is mounted a clencher rim C for the successful fastening of the metallic tire hereinafter fully described.

The metallic tire comprises outer and inner tubiform annular members 5 and 6, repectively, each being preferably made in two sections and from spring steel, the inner member 6 being formed with outwardly curled flanges 7 which are adapted to be engaged in the clencher rim C, and one end of each section of the respective members 5 and 6 is formed with a seat 8 for accommodating the overlapping end 9 of the other section adjacent thereto, and through this overlapping end 9 is passed rivets 9' which are also passed through the end having the seat 8 for the secure fastening of the sections of the members together as shown, after the same have been disposed concentrically about the vehicle wheel.

Secured to the felly B of the vehicle wheel A at opposite sides thereof are clamping rings 10 which have the curved portions 11 thereof disposed in overlapping relation to the sides of the outer member 5 so that the edges of the said member will be clamped between the rings 10 and the sides of the clencher rim C, the rings 10 being fastened to the felly through the medium of transverse bolts 12 which are passed through the felly and the said rings as shown.

Passed through the sides of the clencher flange C and through the sides of the outer member 5 and the curved portions 11 of the rings 10 at intervals throughout the circumference of the tire are securing bolts 13 having adjustably threaded on opposite ends nuts 14 which bear against bearing blocks 15 supported by the bolts 13, and lie against the curved portions 11 of the clamping rings 10, the outwardly curled flanges 7 of the inner member 6 being formed with slots 16 for accommodating the bolts 13 which serve to prevent the creeping of the inner member 6 within the outer member 5 when engaged in the clencher rim C interiorly of the latter.

The members 5 and 6 coöperate to give maximum spring action to the tire and render it puncture proof, thereby increasing the life of the same.

From the foregoing description, taken in connection with the accompanying drawing, the construction of the device will be clearly understood, and therefore a more extended explanation has been omitted.

What is claimed is:—

The combination with a wheel having a rim provided with clencher flanges, of an inner tubular resilient member open throughout the inner periphery thereof, resilient flanges bent outwardly and upwardly from the edges of the inner tubular member to engage in the clencher flanges on the rim and having slots at intervals, an outer resilient casing secured on the rim, and bolt members passed transversely through the casing, rim and the slots in the flanges on the inner tubular member, said slots in the flanges on the inner tubular member opening through the edges thereof.

In testimony whereof I affix my signature in presence of two witnesses.

FREDERICK A. HOWARTH.

Witnesses:
FERDINAND D. BAER, Jr.,
ERNEST BERRY.

Copies of this patent may be obtained for five cents each, by addressing the "Commissioner of Patents. Washington, D. C."